United States Patent
Maki et al.

(10) Patent No.: US 6,876,108 B2
(45) Date of Patent: Apr. 5, 2005

(54) LINEAR MOTOR, ITS CONTROLLING METHOD, AND XY TABLE

(75) Inventors: Kohji Maki, Hitachi (JP); Houng Joong Kim, Hitachi (JP); Yasuo Morooka, Hitachi (JP); Keijirou Sakai, Kanasago (JP); Hitoshi Shibata, Hitachi (JP); Hideki Shimane, Mito (JP); Hisao Tadokoro, Hitachi (JP); Takashi Kobayashi, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 15 days.

(21) Appl. No.: 10/643,965

(22) Filed: Aug. 20, 2003

(65) Prior Publication Data
US 2004/0150269 A1 Aug. 5, 2004

(30) Foreign Application Priority Data
Feb. 4, 2003 (JP) ............................... 2003-026575

(51) Int. Cl.[7] .................................................. H02K 41/00
(52) U.S. Cl. .............................................................. 310/12
(58) Field of Search .............................. 310/12–39, 138

(56) References Cited

U.S. PATENT DOCUMENTS

| | | | |
|---|---|---|---|
| 4,241,268 A | * 12/1980 | Popov et al. | 310/13 |
| 6,448,733 B1 | 9/2002 | Joong et al. | 318/649 |
| 6,467,584 B2 | 10/2002 | Yamamoto et al. | 187/316 |
| 6,548,919 B2 | * 4/2003 | Maki et al. | 310/12 |
| 6,548,920 B2 | 4/2003 | Joong et al. | 310/12 |
| 6,570,274 B2 | * 5/2003 | Kim et al. | 310/12 |
| 2002/0043879 A1 | 4/2002 | Joong et al. | 310/12 |
| 2002/0053445 A1 | 5/2002 | Kim et al. | 173/217 |
| 2002/0053832 A1 | 5/2002 | Akita et al. | 345/107 |
| 2002/0055695 A1 | 5/2002 | Takahata et al. | 601/89 |
| 2002/0070612 A1 | 6/2002 | Joong et al. | 310/12 |
| 2002/0117934 A1 | 8/2002 | Kanazawa et al. | 310/263 |
| 2003/0059320 A1 | 3/2003 | Kim et al. | 417/411 |

FOREIGN PATENT DOCUMENTS

| | | |
|---|---|---|
| JP | 61-085045 | 4/1986 |
| JP | 10-174418 | 6/1998 |
| JP | 2001-28875 | 1/2001 |
| JP | 2002-125360 A | 4/2002 |
| JP | 2002-138754 | 5/2002 |
| JP | 2002-142436 | 5/2002 |
| JP | 2002-142437 | 5/2002 |
| JP | 2002-142439 | 5/2002 |
| JP | 2002-142440 | 5/2002 |
| JP | 2002-143574 | 5/2002 |
| JP | 2002-144255 | 5/2002 |
| JP | 2002-144274 | 5/2002 |
| JP | 2002-186243 | 6/2002 |
| WO | WO-00/69051 | 11/2000 |

OTHER PUBLICATIONS

U.S. Appl. No. : 09/959,615, Entitled: Linear Motor and Manufacturing Method Thereof.

* cited by examiner

*Primary Examiner*—Dang Le
(74) *Attorney, Agent, or Firm*—Antonelli, Terry, Stout & Kraus, LLP

(57) ABSTRACT

Disclosed herewith a compact linear motor provided with a plurality of magnetic pole teeth and used to increase the thrust force by canceling a magnetic attractive force working between the primary member and the secondary member. The linear motor comprises a primary member and a secondary member. The primary member includes cores formed with a magnetic material and an electromagnetic coil wound on the cores while the secondary member supported so as to be capable of moving relatively with respect to the primary member with a gap therebetween. In the linear motor, the coil that is wound commonly on the cores is also disposed between adjacent magnetic pole teeth.

15 Claims, 5 Drawing Sheets

LINEAR MOTOR, ITS CONTROLLING METHOD, AND XY TABLE

FIELD OF THE INVENTION

The present invention relates to a linear motor, a method for controlling the linear motor, and an XY table for moving objects in two directions. The XY table is used to move wafers in two directions, for example, so as to process the surface of each wafer in a manufacturing process of integrated circuits.

BACKGROUND OF THE INVENTION

Generally, a linear motor is provided with a primary member and a secondary member. The primary member has a plurality of magnetic pole teeth. The secondary member is supported by the primary member through a gap so that it can move relatively with respect to the primary member. An electromagnetic coil is wound commonly on a plurality of the same polarity teeth so that the linear motor is reduced in size. Such a linear motor is disclosed in the official gazette of JP-A No.174418/1998 (hereinafter, to be referred to as the patent document 1). The official gazette of JP-A No. 28875/2001 (hereinafter, to be referred to as the patent document 2) also discloses another linear motor that is further reduced in size by winding an electromagnetic coil on all of the teeth of both magnetic polarities.

Furthermore, the official gazette of JP-A No. 85045/61 (hereinafter, to be referred to as the patent document 3) discloses still another linear motor in which a permanent magnet is disposed between magnetic poles to reduce the leak magnetic field.

[Patent document 1] Official gazette of JP-A No. 177418/1998

[Patent document 2] Official gazette of JP-A No. 28875/2001

[Patent document 3] Official gazette of JP-A No. 85045/1986

According to the linear motors disclosed in the patent documents 1 and 2, when a driving current flows in the electromagnetic coil wound on the core, the magnetic flux density in the core increases to cause magnetic saturation. In such a state, the core cannot lead the magnetic flux effectively any longer, thereby the thrust force does not increase how much the driving current increases. This is because the electromagnetic coil is wound commonly on the plurality of magnetic pole teeth, thereby the coil comes to go away from the end of the magnetic pole teeth.

According to the linear motor disclosed in the patent document 3, in which a permanent magnet is disposed between magnetic poles to reduce the leak magnetic field, the use of such permanent magnets is limited only when no change with time occurs in the direction of the leak magnetic field. Generally, the direction of the leak magnetic field changes with time. This is why the use of permanent magnets is not proper for linear motors.

SUMMARY OF THE INVENTION

Under such circumstances, it is an object of the present invention to provide a linear motor compact in structure and larger in maximum thrust force to solve the above conventional problems.

According to one of the features of the present invention, in each of the linear motor and the XY table, a conductor is disposed between magnetic pole teeth adjacent to each other in the moving direction of the secondary member. Consequently, the leak magnetic flux from between the magnetic pole teeth is reduced even when magnetic saturation occurs in the primary member core, thereby the maximum thrust force of the linear motor increases.

According to another feature of the present invention, the method for controlling the above linear motor flows a current in the conductor disposed between the adjacent magnetic pole teeth so as to generate a magnetic flux in a direction for disturbing the magnetic flux flow between the adjacent magnetic pole teeth. Consequently, the leak magnetic flux from between the adjacent magnetic pole teeth is reduced even when magnetic saturation occurs in the primary member core, thereby the maximum thrust force of the linear motor increases.

DETAILED DESCRIPTION OF THE PREFERRED EMBODIMENTS

Figure 1:
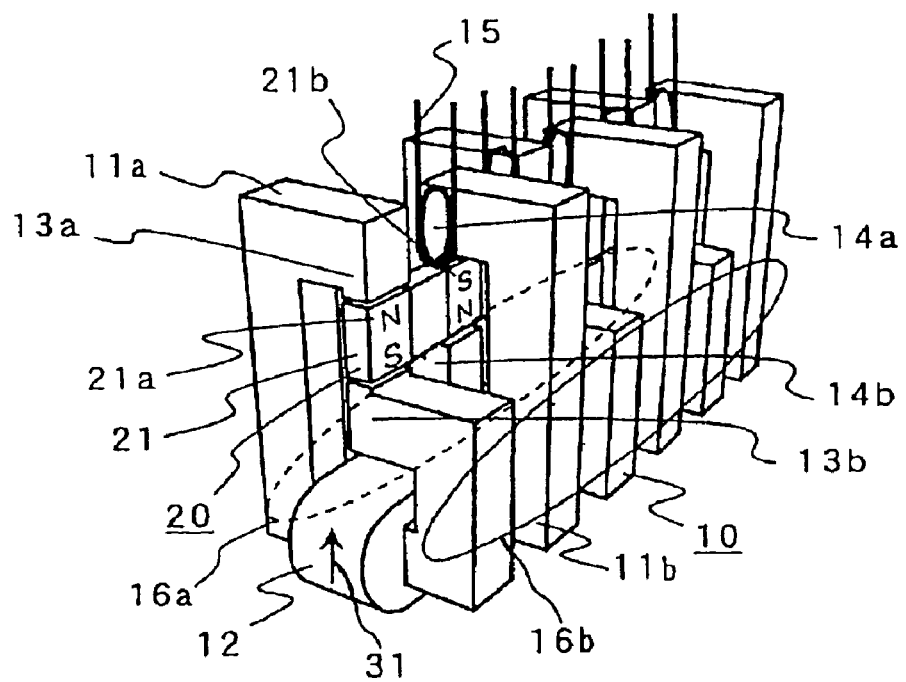
FIG. 1 is a basic block diagram of a linear motor in the first embodiment of the present invention.

Hereunder, the preferred embodiments of the present invention will be described with reference to the accompanying drawings. FIG. 1 shows a basic block diagram of a linear motor in an embodiment (hereinafter, to be referred to as the first embodiment) of the present invention. The linear motor in this first embodiment comprises a primary member 10 and a secondary member 20. The primary member 10 includes first and second cores 11a, 11b formed with a magnetic material respectively, an electromagnetic coil composed as a conductor wound commonly on a plurality of magnetic pole teeth of the first and second cores 11a, 11b, and an electromagnetic coil 15 disposed between the magnetic pole teeth. The secondary member 20 supported so that it can move relatively with respect to the primary member 10 with a gap therebetween. Generally, in such a linear motor, the primary member is fixed while the secondary member is driven or the secondary member is fixed while the primary member is driven. The present invention may employ any of the driving methods. In this first embodiment, a description will be made on the assumption that the secondary member is driven. The magnetic material used to form the core 11 is usually iron, but it may be another material. A permanent magnet 21 is fixed to the secondary member 20 and the magnetic pole teeth are disposed so that one magnetic polarity 21a and the other magnetic polarity 21b appear alternately in the moving direction of the secondary member.

The first core 11a has a first facing portion at which the magnetic pole teeth 13a and 13b face each other while the second core 11b has a second facing portion at which the magnetic pole teeth 14a and 14b face each other. The magnetic polarity differs between the first and second facing portions. If a current flows in the electromagnetic coil 12, the magnetic flux flow in the first facing portion is reversed from that in the second facing portion. For example, if a current flows in the coil 12 in the direction of an arrow 31, the magnetic flux flow in the first facing portion goes down (from 13a to 13b) while that in the second facing portion goes up (from 14b to 14a).

The core 11 has two magnetic polarities; the first polarity (magnetic flux source) 16a and the second polarity 16b. The first polarity is of the magnetic pole teeth 13a and 14b separated in the first step (13a) and in the second step (14b) so as to be disposed approximately vertically to the moving direction of the secondary member 20 while the second polarity is of the magnetic pole teeth 14a and 13b separated in the first step (14a) and in the second step (13b) so as to be disposed approximately vertically to the moving direction of the secondary member 20. In each of the first and second steps, the teeth in arrays are disposed so that one polarity and the other polarity appear alternately. The magnetic polarity differs between the teeth array and the other teeth array. For example, if a current flows in the coil 12 in the direction of the arrow 31, the magnetic flux flow in one polarity teeth array goes out from the teeth while that in the other polarity teeth array comes in the teeth. In the space between the teeth 13a and 14a in the first step and the teeth 13b and 14b in the second step, a region in which a magnetic field is generated in the direction from the teeth in the first step to the teeth in the second step and a region in which a magnetic field is generated in the direction from the teeth in the second step to the teeth in the first step are disposed alternately when a current flows in the coil 12. The secondary member 20 is disposed in the space with a gap therebetween and it moves in accordance with the magnetic field generated in the primary member.

An electromagnetic coil 15 is disposed between the adjacent magnetic pole teeth of the first core and the second core (ex., between the teeth 13a and the teeth 14a) in the moving direction of the secondary member. The coil 15 reduces the leak magnetic flux from between those teeth. The coil 15 is wound on an axis, which is the moving direction of the secondary member 20 and the coil 15 is powered so as to prevent the magnetic field generated by the current flow in the coil 12 wound commonly on both first and second cores from leaking to between the magnetic pole teeth. Consequently, the leak magnetic flux that passes between the adjacent teeth is reduced even when magnetic saturation occurs in the core 11, thereby the thrust force of the linear motor increases. The coil 15 may be kept powered or powered only when the linear motor is required to output a large thrust force. And, instead of the coil 15, a superconductor may be disposed between the magnetic pole teeth to obtain the Meissner effect for reducing the leak magnetic flux.

This is why the linear motor of the present invention is suitable for obtaining a large thrust force instantaneously, for example, suitable for such products as circuit-breakers, change gears, etc.

Figure 2:
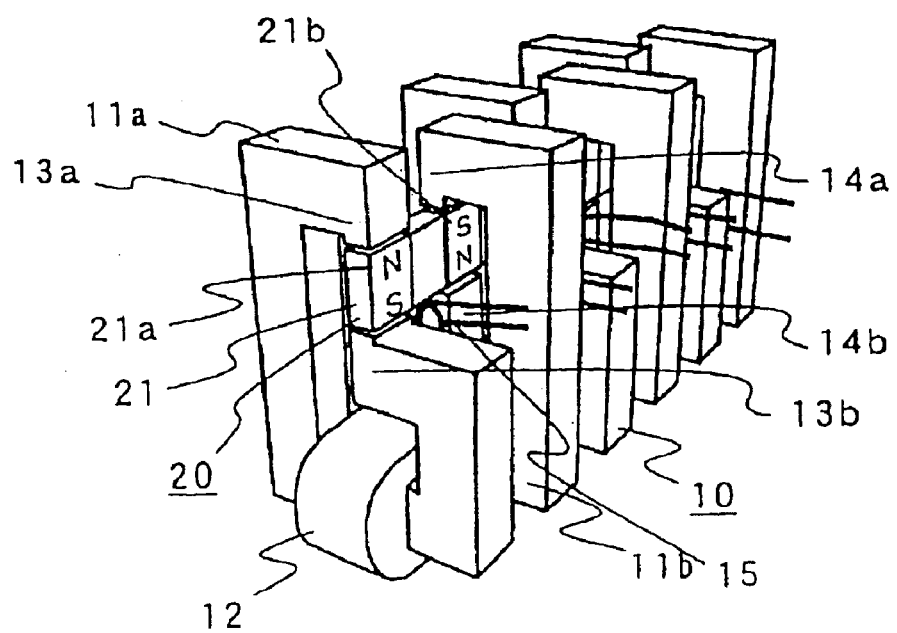
FIG. 2 is a basic block diagram of a linear motor in the first variation of the first embodiment of the present invention.
Figure 3:
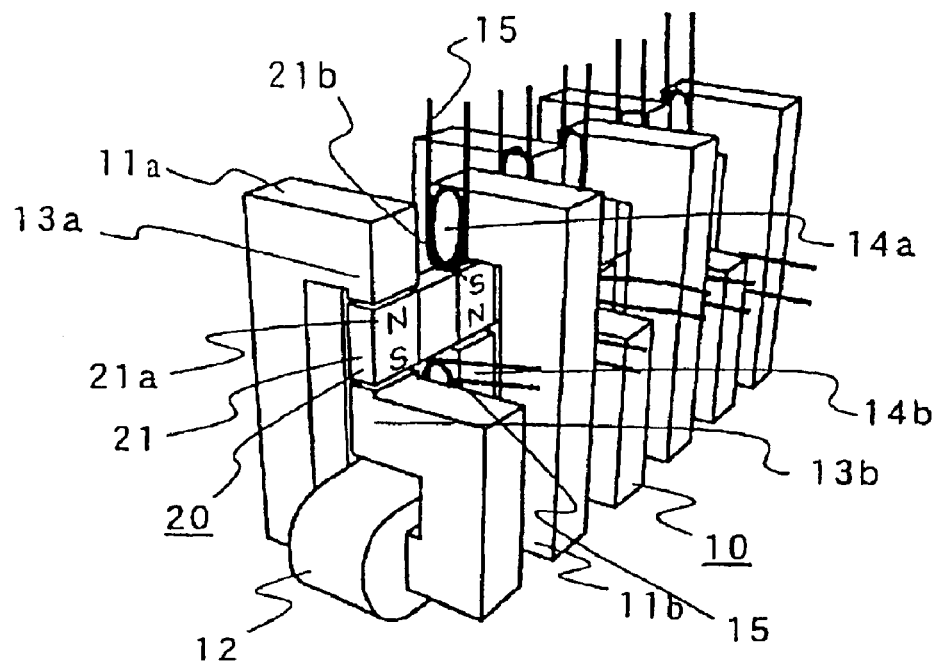
FIG. 3 is a basic block diagram of a linear motor in the second variation of the first embodiment of the present invention.

The coil 15 disposed between the upper magnetic pole teeth as shown in FIG. 1 may also be disposed between lower magnetic pole teeth as shown in FIG. 2. And, the coil 15 may also be disposed between both upper and lower magnetic pole teeth as shown in FIG. 3.

Figure 4:
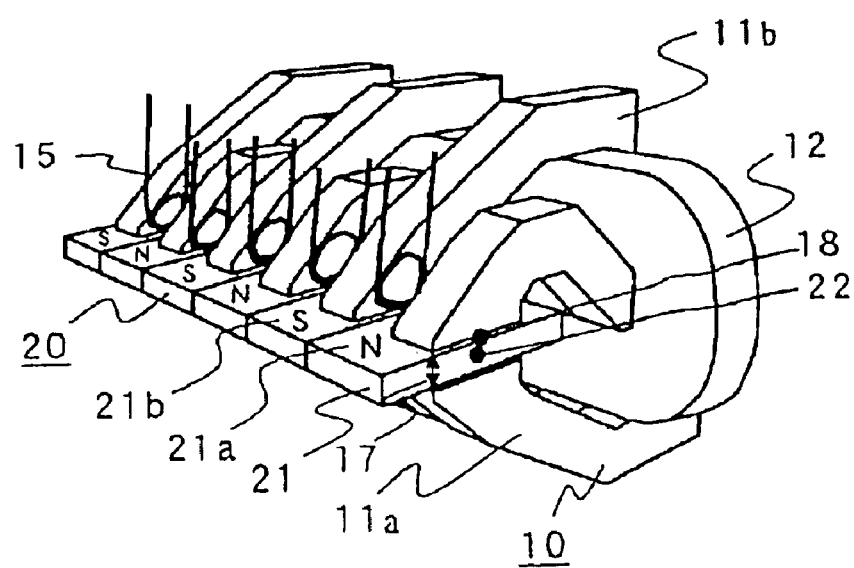
FIG. 4 is a basic block diagram of a linear motor in the second embodiment of the present invention.

FIG. 4 shows a block diagram of a linear motor in another embodiment (hereinafter, to be referred to as the second embodiment). In this second embodiment, a core 11 of a primary member 10 has an opening 17 wide enough to insert the secondary member 20 roughly vertically to the moving direction of the secondary member 20. If the center portion 22 of the secondary member 20 is displaced from the center 18 of the magnetic pole teeth 13, a magnetic attraction force works between the secondary member 20 and the primary member 10 to return the secondary member 20 to position. Consequently, the supporting mechanism of the secondary member 20 may become loose comparatively in the direction towards the center 18 of the magnetic pole teeth. In addition, it is possible to reduce the load applied on the supporting mechanism that supports the secondary member 20 if a magnetic attraction force is generated to cancel the load applied to the secondary member 20 when the secondary member 20 is supported while it is displaced from the center 18 of the magnetic pole teeth 13a.

The coil 15 disposed between magnetic pole teeth is powered just like in the first embodiment so as to prevent the magnetic field generated by the current flow in the coil 12 from leaking to between those teeth. The coil 15 may be kept powered or powered only when the linear motor is required to output a large thrust force.

Figure 5:
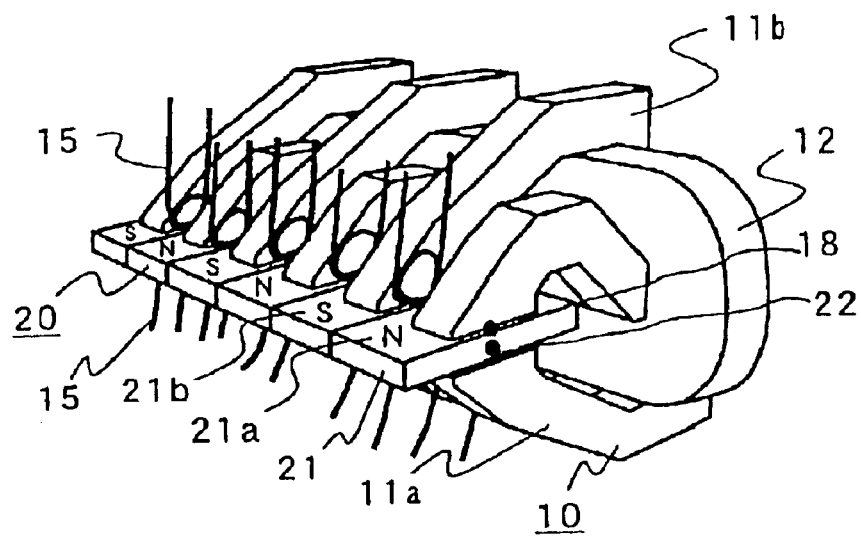
FIG. 5 is a basic block diagram of a linear motor in a variation of the second embodiment of the present invention.

The coil 15 disposed between magnetic pole teeth at one side of the secondary member as shown in FIG. 4 may also be disposed at both sides of the secondary member 20 as shown in FIG. 5.

In the first and second embodiments, the permanent magnet 21 fixed to the secondary member 20 may be replaced with a field magnet coil that generates a magnetic field with a current flown therein. In that connection, a magnetic material may be provided as the core of the field magnet coil. The permanent magnet may also be used as a field magnet coil. The field magnet coils may be disposed in layers partially. The field magnet coil may be printed and wired on a substrate.

The secondary member 20 may be provided with a core formed with a magnetic material so that a magnetic convex and a magnetic concave appear alternately in the moving direction of the secondary member, thereby a reluctance force is generated due to a difference between the magnetic resistance values and used as a thrust force. In that connection, the permanent magnet may be fixed to the secondary member 20 so as to be used as the above core, as well. The magnetic concave maybe formed with a non-magnetic material. In addition, the cross sectional view of the secondary member 20 may not be rectangular; it may be circular or oval, for example.

As described above, in the first and second embodiments, the primary member 10 may be fixedly supported and the secondary member 20 may be movably supported or the secondary member 20 may be fixedly supported and the primary member may be movably supported.

Figure 6:
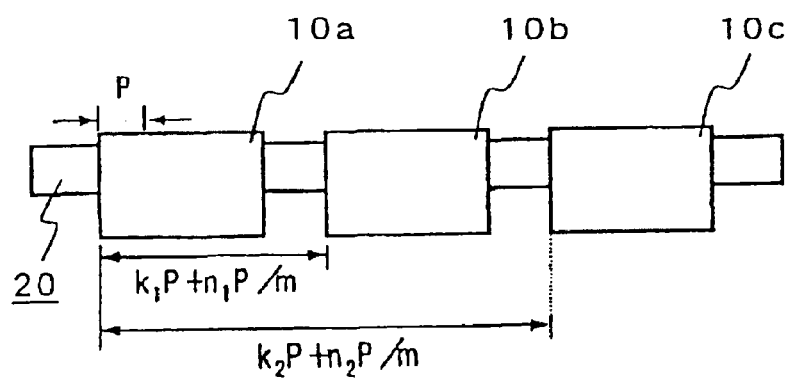
FIG. 6 is a concept chart of the linear motor of the present invention in which a plurality of primary member units are disposed serially.
Figure 7:
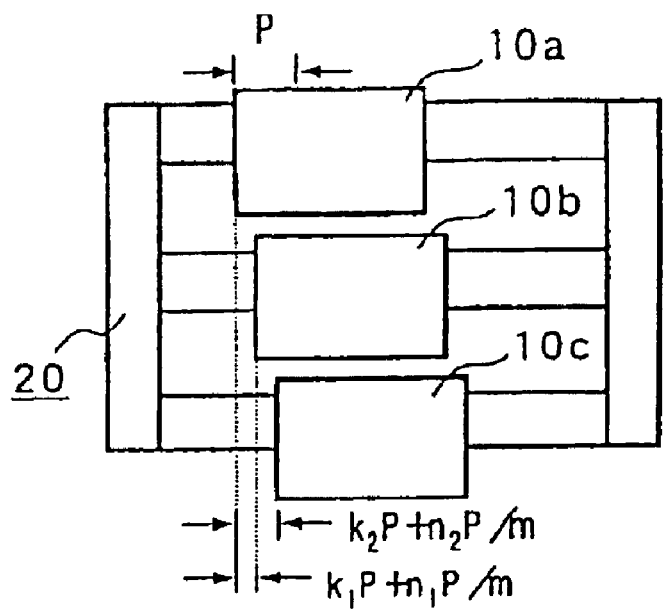
FIG. 7 is a concept chart of the linear motor of the present invention in which a plurality of primary member units are disposed in parallel.

In the final aspect of the linear motor, the primary member 10 shown in FIG. 1 is assumed as one primary member unit and a plurality of the primary member units are disposed, then each primary member unit is required to take a phase. And, if it is assumed that the number of phases is m (m=2, 3, 4, . . . ) and the magnetic pole pitch is P, the pitch of the different magnetic poles of the primary member units in the moving direction of the secondary member satisfies kP+nP/m (k=0, 1, 2, 3, . . . , n=1, 2, . . . , m). Each of the primary member units 10a, 10b, and 10c may be disposed serially as shown in FIG. 6 or in parallel as shown in FIG. 7. When the primary member units are disposed such way, the thrust force pulsation is reduced significantly.

Figure 8:
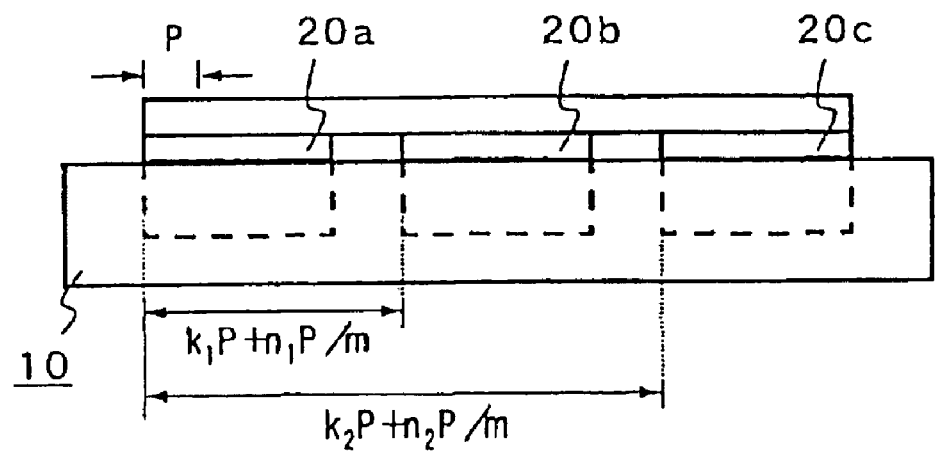
FIG. 8 is a concept chart of the linear motor of the present invention in which a plurality of secondary member units are disposed serially.
Figure 9:
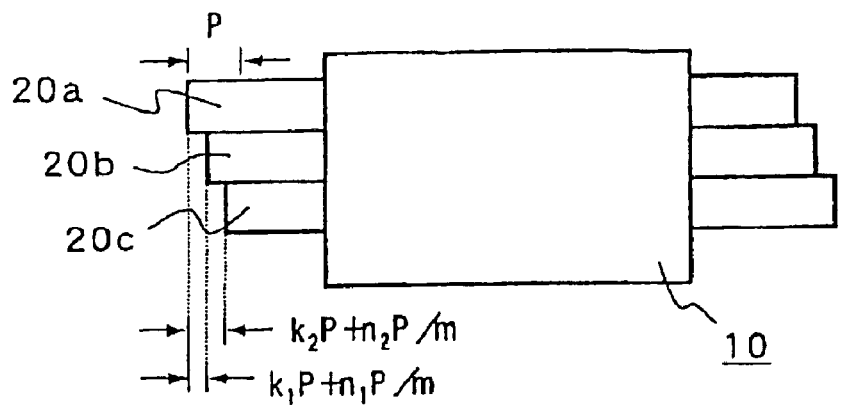
FIG. 9 is a concept chart of the linear motor of the present invention in which a plurality of secondary member units are disposed in parallel.

Otherwise, the secondary member 20 is composed of a plurality of units and each primary member unit takes a phase upon itself and the pitch of the different magnetic poles of the secondary member units in the moving direction of the secondary member satisfies kP+nP/m (k=0, 1, 2, 3, . . . , n=1, 2, . . . , m). In that connection, each of the secondary member units 20a, 20b, and 20c may be disposed serially as shown in FIG. 8 or in parallel as shown in FIG. 9. In the configuration shown in FIG. 8, however, the core 11 of the primary member 10 must have an opening just like in the second embodiment.

Figure 10:
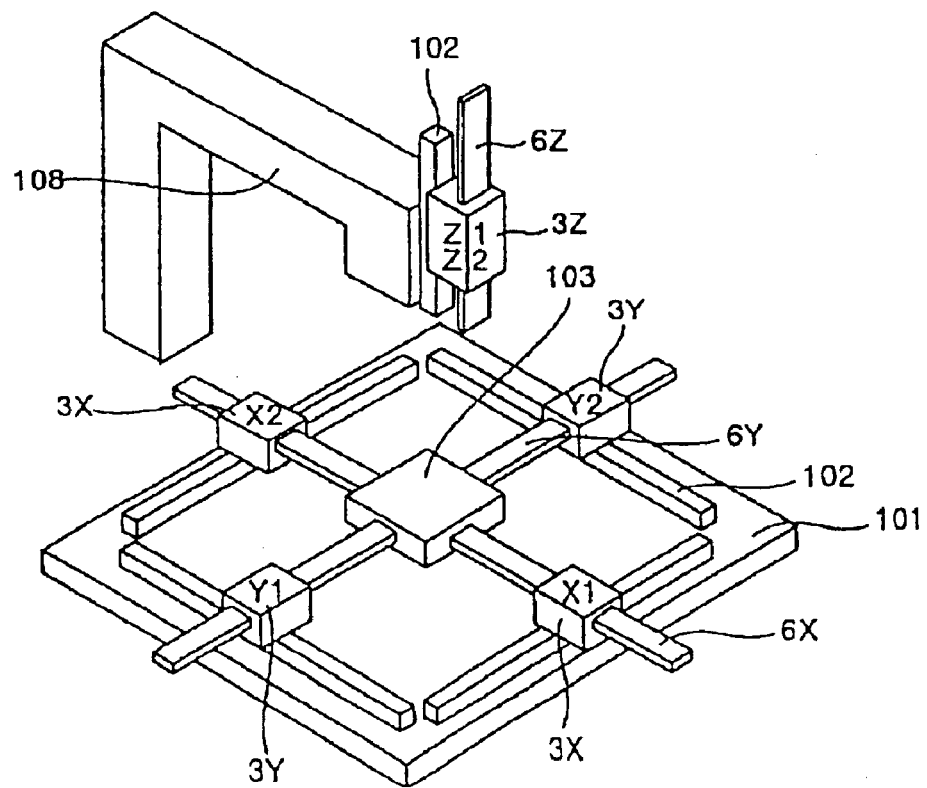
FIG. 10 is a basic block diagram of an XY table in the third embodiment of the present invention.

FIG. 10 shows a basic block diagram of an XY table in still another embodiment (hereinafter, to be referred to as the third embodiment) of the present invention. In FIG. 10, reference numbers are defined as follows; 101 denotes a base, 102 denotes a rail of a linear guide unit, 103 denotes a stage, 108 denotes an arm for supporting the linear guide unit 102, 3X denotes a primary member of an X-axis motors 3Y denotes a primary member of a Y-axis motor in the direction of crossing the X axis, 3Z denotes a primary member of a Z axis motor. 6X, 6Y, and 6Z denote secondary members of the X, Y, and Z axis motors, which are the same as those shown in the above embodiments. The primary member 3X of the X axis motor and the primary member 3Y of the Y axis motor drive the X axis and the Y axis respectively to drive the table 103. In this embodiment, the secondary members 6X and 6Y are driven, but the primary members 3X and 3Y may be driven.

As described above, according to the present invention, the maximum thrust force of the linear motor or XY table can be increased.

What is claimed is:

1. A linear motor, comprising:
  a primary member provided with a first core formed with a magnetic material and having a first facing portion at which a plurality of magnetic teeth face each other and an electromagnetic coil wound thereon, and a second core formed with a magnetic material and having a second facing portion at which a plurality of magnetic teeth face each other and an electromagnetic coil wound thereon; and
  a secondary member disposed between magnetic pole teeth of said first and second facing portions and supported so that it can move relatively with respect to said primary member;
  wherein the direction of a magnetic flux flow differs between said first facing portion and said second facing portion; and
  wherein a conductor is disposed between said magnetic pole teeth adjacent in the moving direction of said secondary member.

2. The linear motor according to claim 1,
  wherein said conductor is an electromagnetic coil wound on an axis that is a relative moving direction of said secondary member.

3. The linear motor according to claim 1,
  wherein said conductor disposed between said magnetic pole teeth is powered in the opposite direction of the direction of a magnetic flux flow between said magnetic pole teeth.

4. The linear motor according to claim 1,
  wherein said secondary member has a permanent magnet or electromagnetic coil; and
  wherein one magnetic polarity and the other magnetic polarity appear alternately in the relative movement direction of said secondary member.

5. The linear motor according to claim 1,
  wherein said secondary member has a core formed with a magnetic material; and
  wherein a magnetic convex portion and a magnetic concave portion appear alternately in the relative movement direction of said secondary member.

6. The linear motor according to claim 1,
  wherein said primary member is fixedly supported while said secondary member is movably supported.

7. The linear motor according to claim 1,
  wherein said secondary member is fixedly supported while said primary member is movably supported.

8. The linear motor according to claim 1,
  wherein said core has an opening approximately vertically in the moving direction of said secondary member.

9. The linear motor according to claim 8,
  wherein said secondary member supported so that its center is displaced from the center of said magnetic pole teeth.

10. An XY table provided with an X-axis motor for driving an object to be transferred in the X direction and a Y-axis motor for driving said object to be transferred in the Y direction that is different from said X direction,
  wherein said table uses said linear motor described in claim 1 as a driving source of said X- or Y-axis motor.

11. A linear motor, comprising:
  a primary member having a core provided with a plurality of magnetic pole teeth and formed with a magnetic material and having an electromagnetic coil disposed thereon, and a secondary member supported through a gap with respect to said magnetic pole teeth such that it can move relative to said primary member,
  wherein one of said two magnetic pole teeth arrays in said core is disposed in two steps approximately vertically with respect to the relative movement of said primary member;
  wherein the other magnetic pole teeth array in said core is disposed in two steps approximately vertically with respect to the relative movement of said secondary member;
  wherein said secondary member is disposed between said magnetic pole teeth in said first step and said magnetic pole teeth in said second step;
  wherein said magnetic pole teeth in said first step of one of said two magnetic pole teeth arrays and said magnetic pole teeth in said first step of the other magnetic pole teeth array are disposed alternately in the relative movement direction of said secondary member;
  wherein said magnetic pole teeth in said second step of one of said two magnetic pole teeth arrays and said magnetic pole teeth in said second step of the other magnetic pole teeth array are disposed alternately in the relative movement direction of said secondary member;

wherein said magnetic pole teeth adjacent to each other in the moving direction of said secondary member differ in polarity from each other; and wherein a conductor is disposed between said magnetic pole teeth adjacent to each other.

12. The linear motor according to claim 11, wherein said conductor is an electromagnetic coil wound in the relative movement direction of said secondary member.

13. The linear motor according to claim 11, wherein a current flows in said conductor disposed between said magnetic pole teeth in the opposite direction of that flowing between said magnetic pole teeth.

14. A method for controlling a linear motor, wherein said linear motor comprises:

a primary member provided with a first core formed with a magnetic material having a first facing portion at which a plurality of magnetic pole teeth face each other and an electromagnetic coil wound thereon and a second core formed with a magnetic material having a second facing portion at which a plurality of magnetic pole teeth face each other and an electromagnetic coil wound thereon; and a secondary member disposed between magnetic pole teeth of said first and second facing portions and supported movably with respect to said first member, wherein the directions of said magnetic flux flow in said first facing portion and said magnetic flux flow in said second facing portion are opposite to each other;

wherein a conductor is disposed between said magnetic pole teeth adjacent to each other in the moving direction of said secondary member; and wherein said conductor between said magnetic pole teeth is powered to generate a magnetic flux flow in a direction that disturbs the magnetic flux flow between said magnetic pole teeth adjacent to each other.

15. The method according to claim 14, wherein a current is flown in said conductor disposed between adjacent magnetic pole teeth when said linear motor requires a large thrust force.

* * * * *